(12) United States Patent
Amyot et al.

(10) Patent No.: US 7,548,967 B2
(45) Date of Patent: Jun. 16, 2009

(54) INTERACTIVE CONFLICT RESOLUTION FOR PERSONALIZED POLICY-BASED SERVICES

(75) Inventors: Daniel Amyot, Hull (CA); Kathy Baker, Ottawa (CA); Thomas Gray, Carp (CA); Ramiro Liscano, Ottawa (CA); Jean-Marc Seguin, Stittsville (CA); Jacques Sincennes, Gatineau (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 495 days.

(21) Appl. No.: 10/680,345

(22) Filed: Oct. 8, 2003

(65) Prior Publication Data

US 2004/0153875 A1 Aug. 5, 2004

(30) Foreign Application Priority Data

Oct. 17, 2002 (GB) ................. 0224187.5

(51) Int. Cl.
   *G06F 15/173* (2006.01)
(52) U.S. Cl. .................. 709/223; 379/15.03; 379/29.08
(58) Field of Classification Search .............. 379/15.03, 379/29.08; 709/223
   See application file for complete search history.

(56) References Cited

U.S. PATENT DOCUMENTS

| | | | |
|---|---|---|---|
| 5,889,953 | A | 3/1999 | Thebaut et al. |
| 5,920,618 | A | 7/1999 | Fleischer et al. |
| 6,243,697 | B1 | 6/2001 | Crowther |
| 6,327,618 | B1 * | 12/2001 | Ahlstrom et al. ............ 709/223 |
| 6,418,468 | B1 * | 7/2002 | Ahlstrom et al. ............ 709/223 |
| 6,484,261 | B1 * | 11/2002 | Wiegel ........................ 726/11 |
| 6,529,954 | B1 * | 3/2003 | Cookmeyer et al. ......... 709/224 |
| 6,611,579 | B1 * | 8/2003 | Drew et al. ............... 379/14.01 |
| 6,880,005 | B1 * | 4/2005 | Bell et al. .................... 709/225 |
| 6,940,847 | B1 * | 9/2005 | Glitho et al. ................. 370/352 |

(Continued)

FOREIGN PATENT DOCUMENTS

EP 0 833 526 A1 9/1996

(Continued)

OTHER PUBLICATIONS

Gorse; The Feature Interaction Problem: Automatic Filtering of Incoherences & Generation of Validation Test Suites at the Design Stage; Sep. 2000; p. 67.*

(Continued)

*Primary Examiner*—Kenny S Lin
*Assistant Examiner*—Brian P Whipple

(57) ABSTRACT

A method and apparatus for defining and validating feature policies in an execution system, such as a communication system. The method includes entering user policies described in a straightforward manner (e.g. using a Web browser and user-understandable language) in such a way that they can be translated into a formal executable language. The user policies are then (translated into an executable feature language such as the IETE's CPL. The user is then either compelled or provided with an option to validate the overall feature set before the overall feature is uploaded to the execution system. If validation is selected, the features are translated from CPL into another format, such as FIAT, from which it is possible to detect common feature specification errors. That FIAT detected errors are then analyzed in a manner that is aware of the expectations and common errors of native users, and interpreted to determine possible errors as errors that are common to naïve users.

13 Claims, 6 Drawing Sheets

U.S. PATENT DOCUMENTS

| | | | |
|---|---|---|---|
| 7,133,511 B2 * | 11/2006 | Buntin et al. | 379/189 |
| 2001/0007106 A1 | 7/2001 | Slaikeu | |
| 2002/0103895 A1 * | 8/2002 | Chiang | 709/224 |
| 2002/0184535 A1 * | 12/2002 | Moaven et al. | 713/202 |
| 2002/0198892 A1 * | 12/2002 | Rychel et al. | 707/102 |
| 2003/0065942 A1 * | 4/2003 | Lineman et al. | 713/201 |
| 2003/0169859 A1 * | 9/2003 | Strathmeyer et al. | 379/88.17 |
| 2004/0161086 A1 * | 8/2004 | Buntin et al. | 379/189 |

FOREIGN PATENT DOCUMENTS

| | | |
|---|---|---|
| GB | 2 363 284 | 12/2001 |
| WO | 02/091756 | 11/2002 |

OTHER PUBLICATIONS

T.F. Bowen, et al.; The Feature Interaction Problem in Telecommunications Systems; Jul. 3, 1989; pp. 59-62.

V.K. McConnell, et al.; Feature Interaction Analysis in the Advanced Intelligent Network: A Telephone Company Perspective; May 23, 1993; pp. 1548-1552.

S. Tsang, et al.; The Feature Interaction Problem in Networked Multimedia Services—Present and Future; Jan. 1997; pp. 235-246.

A. Sefidcon, et al.; FID: Feature Interaction Detection Tool; Oct. 15, 2000; pp. 283-289.

European Search Report; EP 03 25 6555; completed Dec. 19, 2003.

J. Lennox, et al.; CPL: A Language for User Control of Internet Telephony Services; Jan. 15, 2002; IETF Internet Draft.

Z. Fu, et al.: IPSec/VPN Security Policy: Correctness, Conflict Detection and Resolution; Jan. 2001; IEEE Policy 2001 Workshop.

M. Amer, et al.; Feature Interaction Resolution Using Fuzzy Policies; May 2000; Proceedings of the 6th Feature Interaction in Telecommunications and Software Systems, pp. 94-112.

T. Bray, et al.; Extensible markup language (XML) 1.0 (second edition); Oct. 2000; W3C Recommendation REC-xml-20001006.

F. Dawson, et al.; Internet calendaring and scheduling core object specification (iCalendar); Nov. 1998; IETF, Request for Comments 2445.

N. Gorse; The Feature Interaction Problem: Automatic Filtering of Incoherences & Generation of Validation Test Suites at the Design Stage; Sep. 2000; M.Sc. thesis, SITE, University of Ottawa.

J. D. Moffett, et al.; Policy Conflict Analysis in Distrubuted System Management; 1994; Journal of Organization Computing, 4(1), pp. 1-22.

A. Sefidcon, F. Khendek: FID: feature interaction detection tool; 2000; Microprocessors and Microsystems 24 (2000) 283-289.

S. Tang, E.H. Magill and B. Kelly: The feature interaction problem in networked multimedia services—present and future; 1997, BT Technol J. vol. 15 No. 1 Jan. 1997, pp. 235-246.

Von K. McConnell, Margaret E. Nilson, and Elenita E. Silverstein: Feature Interaction Analysis in the Advanced Intelligent Network: A Telephone Company Perspective, 1993, 0-7803-0950-2/1993, IEEE, pp. 1548-1552.

T.F. Bowen, F.S. Dworack, C.H. Chow, N. Grifffeth, G.E. Herman, Y-J Lin: The Feature Interaction Problem In Telecommunications Systems, Bellcore, USA.

* cited by examiner

INTERACTIVE CONFLICT RESOLUTION FOR PERSONALIZED POLICY-BASED SERVICES

FIELD OF THE INVENTION

The present invention relates in general to Internet telephony and services where enterprises and end-users have the capability of personalizing their features, and more particularly to detection and resolution of conflicts in telephony services and features described using policy-based (scripting) languages such as CPL.

BACKGROUND OF THE INVENTION

IP (Internet Protocol) and related new forms of applications are now incorporating a high degree of personalization. In IP telephony, technologies such as CPL (Call Processing Language) are being defined to allow users to specify their own services and features for controlling the handling of calls. Call processing is currently the domain of experts who thoroughly understand the issue of conflicts among features. Multiple features may interact in ways that create indeterminate behavior. If care is not taken, the addition of a new feature may cause errors in the actions of features that had previously worked flawlessly. New features are evaluated extensively in the design process by experts and tested in conjunction with all other features after the design phase in order to prevent undesired interactions from affecting the end user.

With the advent of personalized features, the reliance on expert designers is no longer possible since users are now able to design their own features. In particular, users who are ordinarily unfamiliar with the issues of formal logic expect features to be understood and conflicts to be resolved in ways that they find natural. It is common for an executive to tell his/her secretary that no calls should be put through in the afternoon and also to tell him/her that if an important customer named Terry March calls to put him straight through. What happens if Terry March calls in the afternoon? It might not be difficult for an ordinary user to identify the conflict if these were the only two instructions specified. However, if these were but two of many policies and were specified at different times, it might be difficult for a user more concerned with other matters to identify the conflict at first glance.

Accordingly, there is a need in the art for a mechanism to allow an ordinary user to test or validate the overall behavior of all policies that he/she has specified so that he/she will understand and approve of all of the interactions among them. Such a mechanism must be sensitive to how a naïve user will tend to specify features and the user's expectation that they will be resolved.

This expectation tends to favor more specific polices over less specific ones. This specificity may address time, people or places. Users could, for example, specify a place such as a particular meeting room and expect it to predominate over a more abstract concept such as policies on all meeting rooms. Specific persons may predominate over more abstract groups, and more specific times may predominate over more abstract time descriptions.

As discussed above, prior art communication services such as the AIN (Advanced Intelligent Networks), have been created by expert engineers who have relied on two options for detecting and resolving conflicts or undesirable interactions:

1. At design time (offline): When different services (often created independently) are integrated into the system, conflicts and their resolution may be undertaken before the features are made available to the end-user. Techniques such as testing and proofs based on formal models can be applied at the requirements, design, and code level to detect interactions, and service precedence or tighter service integration can be used to solve them.

2. At run time (online): When not all conflicts or undesirable interactions can be eliminated at design time; service providers can rely on run-time mechanisms that monitor the system used by the customer and react dynamically to resolve a problem once detected.

In both of the above cases, the resolution is the same for all users, whatever their preferences, intentions, context, or understanding of the services.

As indicated above, new types of communication/collaboration services and applications are emerging, enabled by recent IP telephony protocols and languages such as SIP (Session Initiation Protocol) and CPL (Call Processing Language). These services benefit from the availability of various sources of contextual information (e.g. user's location, presence, schedule, relationships, preferences, etc.) to satisfy a wide variety of requirements. Such services are easily tailored to different vertical markets and are adaptable to changing customer needs and expectations. These services are no longer being defined centrally by expert designers, but rather are being defined at the edge of the network, by-end-users who are not trained in the details of feature design.

In the personalization context addressed herein, end-users have the capability of creating their own services through policies, and are able to define their own solutions to resolving conflicts among these policies. Two main situations can be distinguished:

A. Conflicts among policies of a single user: Such conflicts can be detected at design time, when a user inputs policies in the system. Since the system and the user have knowledge of all the policies of this user, there is an opportunity of resolving conflicts interactively. Moreover, different users have the flexibility to resolve conflicting policies in different ways, which is not the case in traditional prior art systems.

B. Conflicts among policies of multiple users: Since there can be a large number of users, each with their own set of policies, the number of potential conflicts rapidly becomes unmanageable. Design time detection with interactive resolution is inadequate because of the sheer number of conflicts to solve (many of which may never occur if two particular users never call each other) and of the need to negotiate a resolution among multiple users. Conflicts of this type must therefore be detected at run time. U.S. Pat. No. 5,920,618 (Fleischer and Plunkett) entitled Apparatus and Method for Managing Telephony-Based Services describes such a mechanism for Advanced Intelligent Networks (AIN), which uses conflict detection rules described in an expert system. U.S. Pat. No. 6,243,697 (Crowther) entitled Detecting Service Interactions in a Telecommunications Network, also for AIN, makes use of an expert system where interaction rules check services' data parameters for detecting interactions. Conflict resolution can be conventional (resolution mechanisms embedded in the system to provide the same resolution for all users), based on fuzzy logic (e.g. Amer, M., Karmouch, A., Gray, T. and Mankovskii, S. *Feature Interaction Resolution Using Fuzzy Policies*, in Proceedings of the 6th Feature Interactions in Telecommunications and Software Systems, pp. 94-112, Amsterdam, Netherlands, May 2000. IOS Press), or interactive (e.g. while using the service, the user is prompted when a conflict is detected).

Although several solutions exist for items 1, 2, and B above, there is currently no solution proposed for A where a user creates several individual policies. New languages for telecommunication systems such as IETF's Call Processing Language (CPL) support policies, but CPL assumes an outside mechanism for detecting interactions at design time (it has no mechanism on its own). CPL triggers a feature when all pre-conditions are met and so uses a totally-ordered priority system for resolution.

More particularly, CPL bundles operations for incoming and outgoing calls into two independent decision trees. Since the feature preconditions are ordered, these trees provide an absolute ordering of priorities among the features. This creates the desirable condition of no possibility of indeterminacy among pre-conditions. However this comes at the expense of requiring the user to create this absolute ordering.

The totally-ordered priority system of CPL is sufficient in an execution environment, but is inadequate in a design environment because individual policies no longer exist and hence their management becomes next to impossible. A small change to one individual policy can require a complete restructuring of the CPL script that integrates all of a user's individual policies. However, enabling users to define individual policies may lead to undesirable interactions such as loops and shadowing.

Shadowing may be described as an overlap in feature preconditions. One policy may become unreachable and never executed because calls that meet its preconditions are handled by the shadowing policy. So, for example, a policy that forwards all calls that arrive from 2:00 pm to 4:00 pm to voice mail would shadow a policy where all calls from John Doe from 2:30 pm to 3:00 pm should be forwarded directly to the user. In order for the policies to operate properly, an understanding of the common intentions of human users must be developed, as discussed in greater detail below.

Policy conflict detection is present in various domains, principally in the field of network management. Much of the existing work is based on concepts developed by Sloman and Moffett (see Moffett, J. D. and Sloman, M. S. *Policy Conflict Analysis in Distributed System*, in Journal of Organizational Computing, pp. 1-22, 1994). In particular, Thebaut et al. (Policy management and conflict resolution in computer networks. U.S. Pat. No. 5,889,953, Mar. 30, 1999) have embedded in their system conflict resolution rules that are triggered at run time. Ahlstrom et al. (Recognizing and processing conflicts in network management policies. U.S. Pat. No. 6,327,618, Dec. 4, 2001) provide detection and interactive resolution in their system based on simple policies, but without addressing proper needs of complex communication systems (rich policy language and resolution mechanisms other than plain precedence) and usability concerns (suggestions, hiding the policy language, etc.). Fu et al. tailored Sloman's work to detect and solve IPSec policy conflicts, at run-time, while trying to comply with security requirements (see Fu, Z., Wu, S. F., Huang, H., Loh, K., and Gong, F. *IPSec/VPN Security Policy: Correctness, Conflict Detection and Resolution*. IEEE Policy 2001 Workshop, January 2001).

Other fields of application also benefit from the use of policy-based systems, such as set forth in Slaikeu (System for the analysis of organizational conflicts, U.S. Patent Application 20010007106, Jul. 5, 2001) who uses policies and detection/resolution (based on an expert system) for organizational conflicts.

In conclusion, none of the foregoing prior art methods are well adapted to solve the particular problem expressed in A), above. Techniques developed for network management are not well-tailored to personalized communication services, features, and applications. Moreover, techniques developed for AIN are not suitable for use in IP systems where services are created at the edge of the network.

SUMMARY OF THE INVENTION

According to the present invention, a method and apparatus are set forth for defining feature policies and handling the specific stages of this definition. In general, the process includes:

1. Entering user policies described in a straightforward manner (e.g. using a Web browser and user-understandable language) in such a way that they can be translated into a formal executable language.
2. Translating this user-understandable language into an executable feature language such as the IETF's CPL.
3. Either compelling or providing the user with an option to validate the overall feature set before it is are uploaded to the execution system.
4. If validation is selected, translating the features from CPL into another format, such as FIAT, from which it is possible to detect common feature interaction errors.
5. Take the FIAT detected errors and analyze them in a manner that is aware of the expectations and common errors of naive users. Interpret the FIAT determined possible errors as errors that are common to naïve users.
6. Report these errors to the user (e.g. via the Web interface) in terms that are understandable to naive users and compatible with how the policies were originally described.
7. Provide the user with options to either accept the interactions as they are, repair them manually or to accept a recommendation of an automatic correction. Unlike conventional systems, where feature interactions are solved in the same way for all users, the selected resolution is personalized in the present invention to satisfy the end-user's intentions, independently of how others solve similar conflicts.
8. Upload the features to the execution system.

The present invention relates to the overall process and all of the above steps except for the processes in FIAT error detection. In particular the translation of CPL into a FIAT representation and the analysis of the FIAT results in terms of naive user errors and expectations form part of the present invention whereas the operations specific to FIAT itself form part of the prior art.

BRIEF DESCRIPTION OF THE DRAWINGS

The invention will be better understood with reference to the drawing, and following description, in which.

DETAILED DESCRIPTION OF PREFERRED EMBODIMENTS

Before turning to a detailed description of an embodiment of the present invention, a brief description is provided of the main background concepts used to implement the invention. These background concepts are publicly known and, as such, do not form part of the invention.

Call Processing Language (CPL)

The Internet Engineering Task Force (IETF) has standardized a protocol-independent Call Processing Language (CPL) for Internet telephony services (see Lennox, J. and Schulzrinne, H. *CPL: A Language for User Control of Internet Telephony Services*. IETF Internet Draft, Jan. 15, 2002). CPL uses the eXtensible Markup Language (XML) to describe personalized services in terms of policies applicable to incoming calls and outgoing calls (see Bray, T., Paoli, J. and Sperberg-McQueen, C. M. *Extensible markup language (XML) 1.0 (second edition)*, W3C Recommendation REC-xml-20001006, World Wide Web Consortium (W3C), October 2000). CPL is powerful enough to describe a large number of services and features, but it has imposed limits so that it can run safely in Internet telephony servers to prevent users from doing anything more complex (and dangerous) than describing Internet telephony services. The language is not Turing-complete, and provides no mechanism for writing loops or recursive scripts.

CPL scripts can be created by end-users to proxy, redirect, or reject/block calls. Policies for one user are combined into a single CPL script and expressed as a decision tree where the conditions are based on different types of switches (based on addresses, call priority, time, language and any string). There are potentially two decision trees: one for incoming calls and one for outgoing calls. Sub-actions can be defined to improve consistency and reusability. Time conditions, expressed using Time switches, are based closely on the specification of recurring intervals of time in the Internet Calendaring and Scheduling Core Object Specification (iCalendar COS, as set forth in Dawson, F. and Stenerson, D. *Internet calendaring and scheduling core object specification (iCalendar)*, Request for Comments 2445, Internet Engineering Task Force, November 1998).

Policy-Based Call Control

Figure 1:
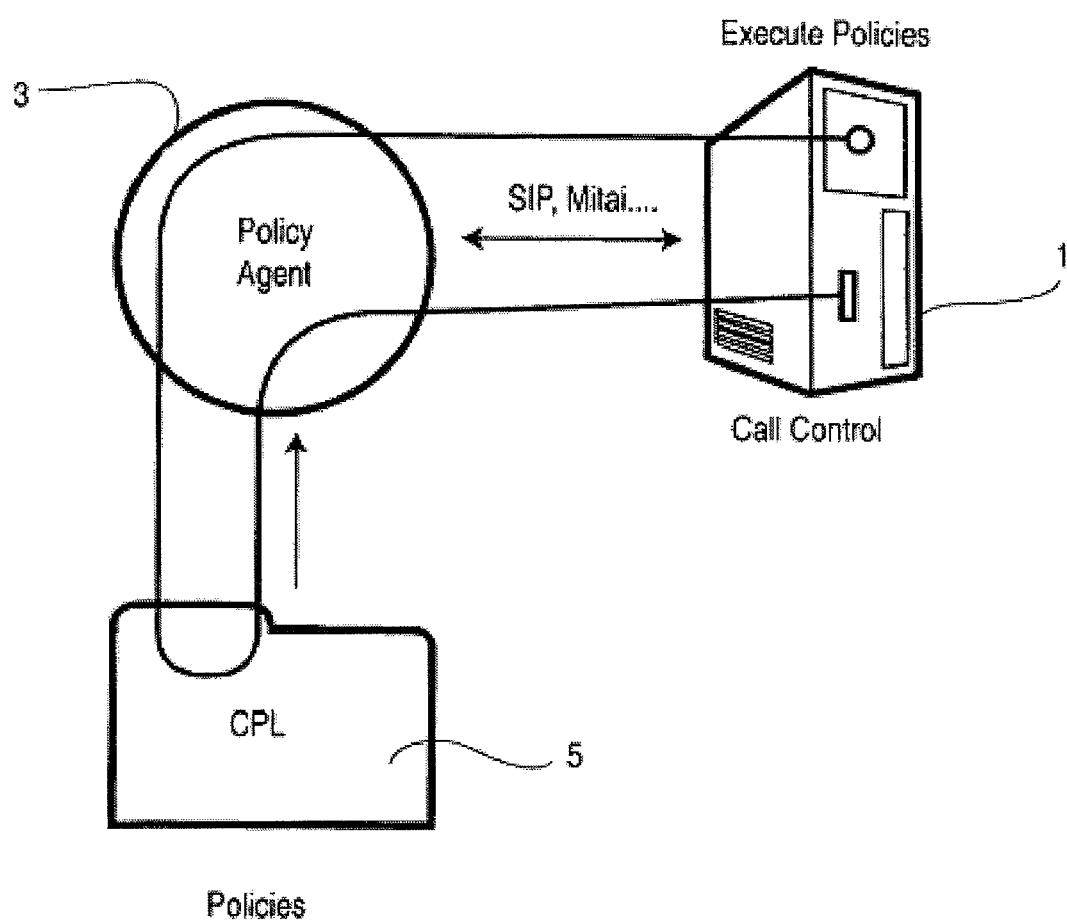
FIG. 1 is a Use Case Map showing policy execution on call control, as is known in the art.

Call control engines in present day (IP) PBXs, switches, gateways, and proxy servers have been designed to make use of policies to implement, control or restrict various types of communication services. In this sense, policies are executed by the call control engine. FIG. 1 depicts a Use Case Map for the simple situation of policy execution in call control. In the Use Case Map (UCM) notation, the scenario starts with a filled circle (triggering event), progresses along a path (superimposed on entities and components), and terminates with a bar (result). Such scenarios are independent from the types of messages exchanged between the components.

In the scenario of FIG. 1, a conventional call control engine 1 queries its policy agent 3 upon the reception or sending of a communication by a user (e.g. a telephone call). The policy agent 3 accesses and executes the relevant policies 5 (described as CPL scripts or in another representation) in response to which the call control 1 handles the communication (e.g. redirects the call, blocks the call, logs the call, etc.). The protocol used between the call control engine 1 and the policy agent 3 is well known and therefore not further described herein (e.g. SIP, H.323 or proprietary signaling protocols such as MiNet can be used).

Feature Interaction Analysis Tool (FIAT)

In a recent thesis, Gorse provides a logic representation of communication features and a tool (FIAT) for "filtering" (i.e. detecting) incoherences among these features, at the requirements level (see Gorse, N. *The Feature Interaction Problem: Automatic Filtering of Incoherences & Generation of Validation Test Suites at the Design Stage*. M.Sc. thesis, SITE, University of Ottawa, Canada, September 2000). Although it was not the author's initial intent, the FIAT tool can be used in the context of personalized communication policies to detect policy conflicts.

In FIAT (Feature Interaction Analysis Tool), features are described using a four-part tuple having a Prolog-based syntax, as follows:

Preconditions: mandatory conditions or system states under which the feature is activated (e.g. this policy is active from Monday through Friday only).

Triggering events: action(s) triggering the feature (e.g. there is an incoming call).

Results: represent the actions produced by execution of the feature and the state of the system after such execution (e.g. forward the call to the voice mail system).

Constraints: restrictions relative to the variables used in the preconditions, triggering events, and results describing the feature (e.g. originator is different from terminator).

The vocabulary used for the conditions and actions is not pre-determined and is hence very flexible. A feature description also specifies which user is concerned (i.e. influenced) by the feature (usually the subscriber or the user targeted by a redirection or blocking functionality). Additionally, contradictions can be defined explicitly between user-defined terms. For instance, busy(A) can be defined as being in contradiction with idle(A).

The Feature Interaction Analysis Tool (FIAT) is a Prolog program that uses feature descriptions as inputs and uses filtering rules to detect incoherences, which are then reported as outputs. Six filtering rules are currently part of the tool, but others can easily be added.

D1: Two features from the same user are triggered by the same events and yield different but not contradictory results.

D2: Two features from the same user are triggered by the same events and yield contradictory results.

D3: Two users subscribe to two different features that concern the same user. These features are triggered by the same events and yield different but not contradictory results.

D4: Two users subscribe to two different features that concern the same user. These features are triggered by the same events and yield contradictory results.

T1: The results of a feature trigger another feature description and results of both descriptions present a contradiction (transitive incoherence).

T2: the results of a feature trigger another description and vice-versa (loop incoherence)

These rules are implemented in Prolog, and the tool makes extensive use of Prolog's backtracking and unification mechanisms to ensure that potential incoherences are indeed detected.

For each incoherence detected, FIAT generates an example of a specific situation or scenario that would lead to an undesirable interaction. These scenarios can be used as user information to better illustrate a problem, or be converted to test cases, which are reported as text-based output.

Finally, FIAT supports a database of previously found incoherences. This database can be used to report only new incoherences (e.g. when a new feature is added).

As discussed briefly above, the current techniques used for managing policy-based communications suffer from several limitations. Policy languages such as FIAT or CPL are not easily usable by common end-users as they are closer to logic and programming languages than to natural language. Even though usability was one of CPL's goals and even though policies in general can be scripted manually (e.g. in XML), this usually requires an expertise level that most end-users do not have or are not willing to learn. The policy descriptions should therefore be hidden behind a usable interface tailored to the work environment of the end-user. Web and voice interfaces are nowadays commonly used both by enterprise workers and by individuals at home, and policies can be managed through such interfaces to create, modify, delete, activate, deactivate, and prioritize policies.

It is important to distinguish between policies used to describe individual services and those that are meant for execution. To go from the first to the second requires integrating the policies in some way. Because of a more focused scope, individual services are easier to create, understand, select and maintain. CPL is good at describing integrated communication policies as two decision trees (for incoming and outgoing calls), and this is suitable for execution by policy agents. However, describing the integration directly becomes rapidly more error-prone and difficult to manage for the user than keeping individual policies separate. A simple modification to one individual policy may require a complete restructuring of the integrated CPL tree. Therefore, there is a need to go from user-suitable individual policies to an execution-suitable integrated version of these policies.

Conflict detection among policy-based communication services is difficult with existing concepts. Firstly, CPL does not offer any support for conflict detection because the selection of a branch in a script's decision tree is always deterministic. The first condition of a switch that is satisfied is selected, and the presence of other satisfied conditions in the same switch is not seen as problematic even though this could be a symptom of script that incorrectly supports the user's intentions. The burden is on the user to integrate his/her individual policies to obtain a resulting behaviour that satisfies his/her original intentions. Keeping the original policies separate with a loose integration (initially) and resolving conflicts interactively can guide the generation of the desired integration. Also, FIAT's language was meant for user-defined features, rather than for policies. A mechanism to convert policies in general (and CPL in particular) to FIAT's language is necessary to enable the usage of FIAT's filtering rules (which become policy conflict detection rules).

Like many other feature interaction detection tools, FIAT describes the detected incoherences (conflicts) as well as examples of problematic scenarios. However, such tools usually have two limitations. FIAT and similar tools do not report the conflicts detected in the user-level (natural) language used to define the policies involved. They usually report them in terms of the formal representation of the policies, thereby requiring a conversion from that formal representation to the language used in the original (Web-based) policy management system. FIAT and similar tools also do not provide suggestions on how to resolve the conflicts detected. These suggestions need to be adapted to the nature of the policies involved as well as the type of conflict.

Once conflicts are reported, they can be solved by the end-user, but there are several limitations. Conventional approaches often implement one resolution mechanism (at design time or at run time) for all users, but this is not acceptable in a context where users have the opportunity to create their own services. Resolution mechanisms must be allowed to vary from user to user. Suggesting solutions is only half of the problem. These solutions need to be supported by highly usable means to implement them (e.g. a simple click of a mouse for interactive resolution). The prior art does not address this issue.

Figure 2:
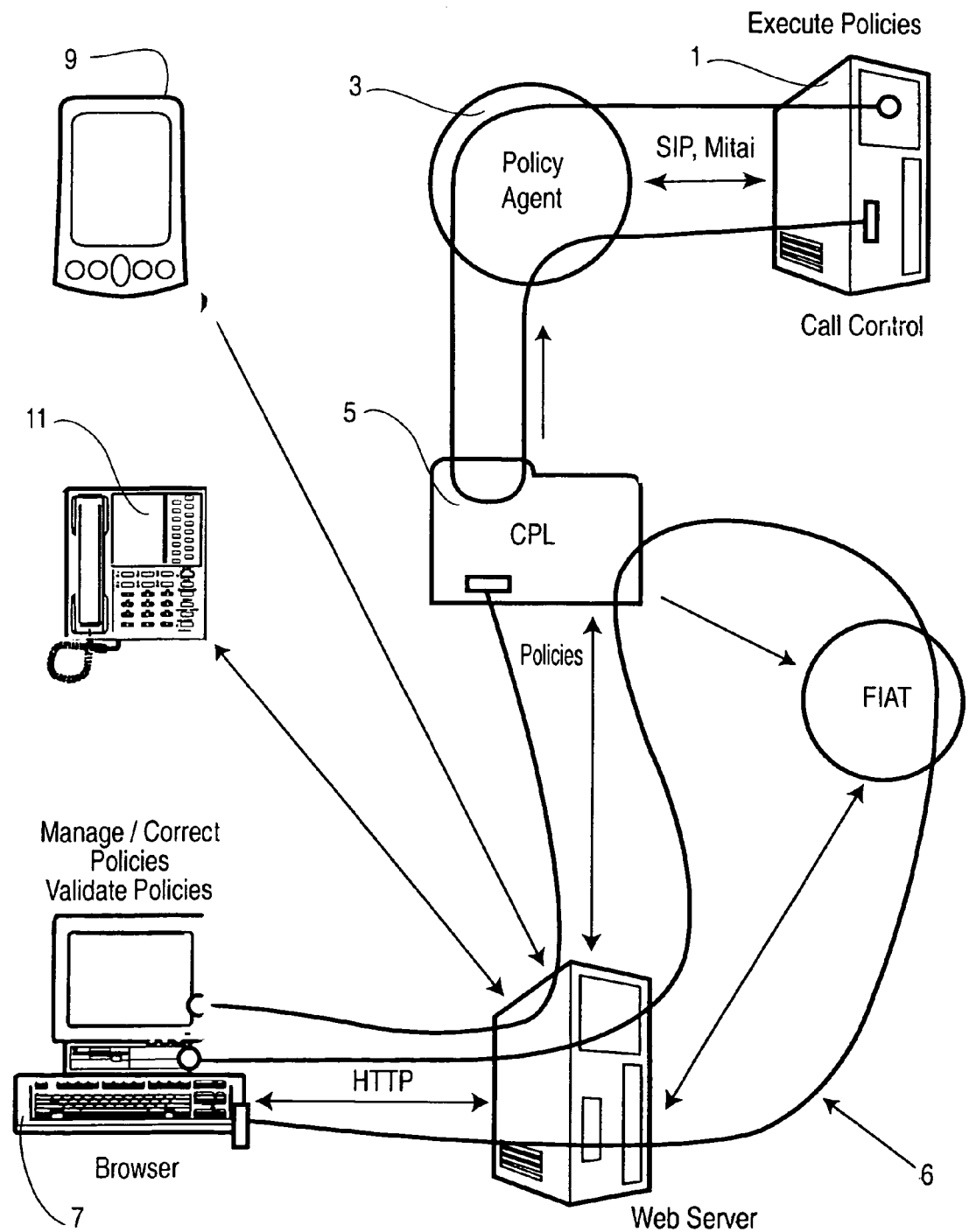
FIG. 2 is a Use Case Map showing policy management, conflict detection, and conflict resolution according to the present invention.

Turning to FIG. 2, the policy-based call control introduced with the UCM of FIG. 1 is supplemented by providing a policy management system 6 for supporting policy management, conflict detection, and conflict resolution.

A policy management interface is presented to the end-user through a Web Browser running on a Web server 7 (e.g. Netscape, Internet Explorer, Opera, etc.). Although a Web server 7 is shown, for description purposes, it will be understood that browsers are available for use on various devices, including personal computers, Personal Digital Assistants 9 (PDAs), wired phones with large screens 11 (e.g. Mitel 5140 Webset), and cellular phones, etc. Accordingly, access to the policy management system 6 is somewhat device independent.

Web-based policy management enables the creation, modification, deletion, activation, deactivation, and prioritization of policies. Web-based interfaces are easily adaptable to any home or work environment (e.g., hospitality, medical, engineering, legal, etc.) and can communicate with the end users using a language and a terminology with which they are familiar. Policies can hence be described interactively in those terms, and translated to a particular representation (e.g. CPL) by a conversion application running on the Web server 7, as shown by the Manage Policies UCM in FIG. 2. Thus, CPL can be entirely hidden from the end-users, thereby achieving one of the objectives set forth above.

The Web-based interface represents individual policies internally (e.g. in proprietary ASCII format or in a database, or using a standard representation such as CPL). The same interface is also capable of synthesizing a single script (e.g. in CPL) that integrates all the activated policies that belong to a user. This integrated script is used at run time by the policy-based call control engine 1 (as shown by the Execute Policies UCM in FIG. 2).

Similarly, although the scenarios illustrated herein focus on Web-based interfaces, a voice-activated interface may be used to provide audio menus and speech-recognition capabilities for enabling a user to manage policies through their phone (wired or wireless).

The Validate Policies UCM in FIG. 2, adds policy conflict detection functionality to the policy management system 6 such that upon a simple request (e.g. user click of a validate button), the system detects potential issues in the user's list of activated policies. To enable this, the policies are converted to a formal representation suitable for analysis, such as FIAT rules. Once translated, individual policies are processed by the FIAT tool, which reports various types of conflicts and counter-examples as described briefly above. Since the report describes conflicts in terms of FIAT rules that are unsuitable for the user, the reported conflicts are converted to HTML code for presentation in the Web-based policy management interface via Web server 7.

In addition to conflict reporting, suggestions on how to resolve these conflicts are generated and reported. These suggestions (edit, disable, reprioritize, add an exception, or tolerate) are tailored to the particular type of conflict and to the policies involved, and are presented to the user in a menu or as hyperlinks in the policy management interface. Selecting one of them (e.g. via the Correct Policies UCM in FIG. 2) activates the proper sequence of requests to the application on the Web server 7 to fix the problem according to the option chosen. The individual and integrated policies are then regenerated. It will be noted that this resolution is local to the user and in no way affects how other users may resolve their own policy conflicts.

Figure 3:
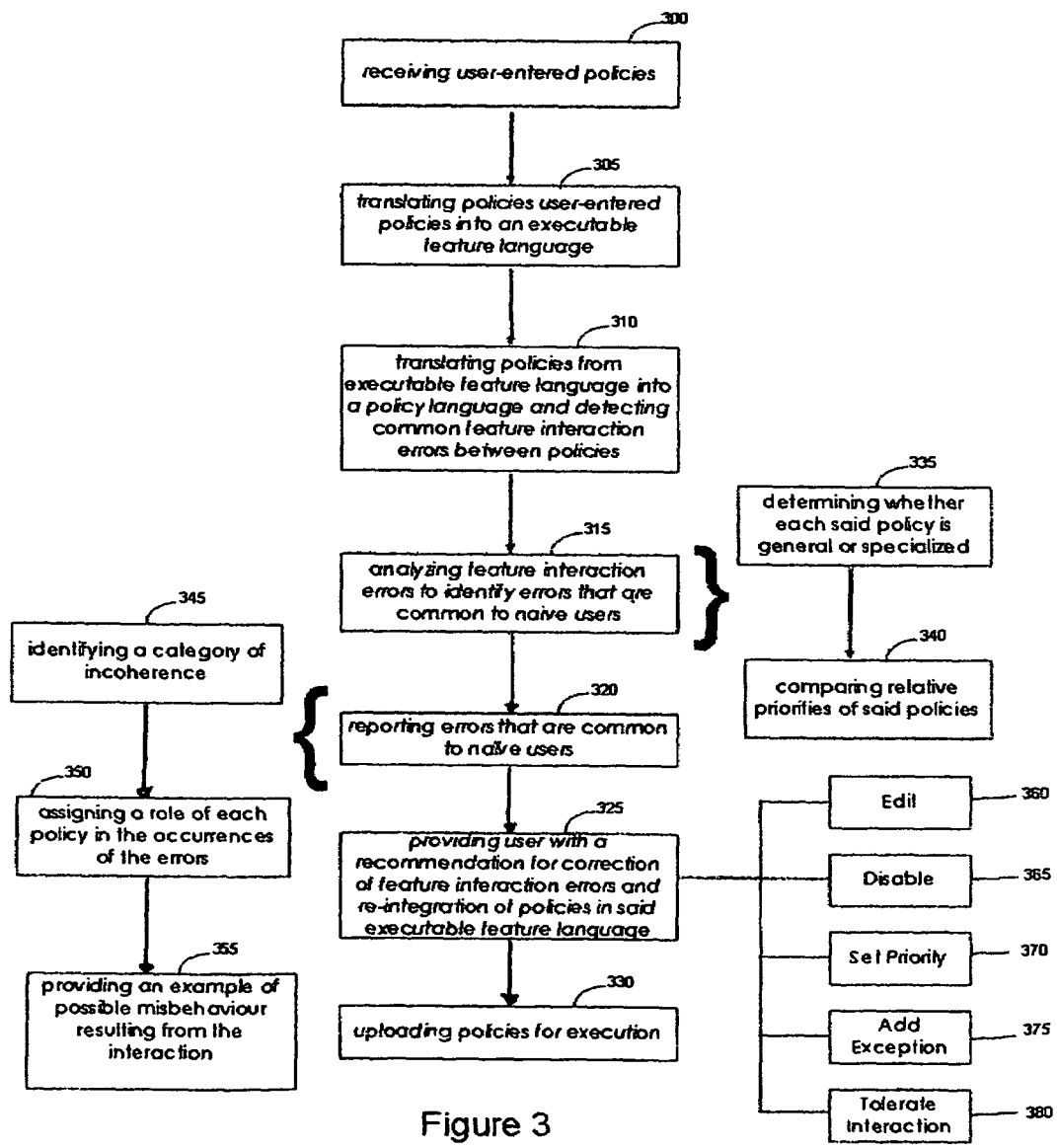
FIG. 3 is a block diagram showing a method of user policy management.

The system of FIG. 2 provides an overall mechanism for the creation, management, testing and provisioning of policies as depicted in the flowchart of FIG. 3. More particularly, the method according to an exemplary embodiment includes: entering user policies (300); translating this user-understandable language into an executable feature language (305); translating the features from executable feature language into a policy language (310), such as FIAT, from which it is possible to detect common feature specification errors; analyzing the errors (315) in a manner that is aware of the expectations and common errors of naïve users; report these errors (320) to the user (e.g. via the Web interface) in terms that are understandable to naive users and compatible with how the policies were originally described; provide the user with options to either accept the interactions as they are, repair them manually or to accept a recommendation of an automatic correction (325); and uploading the policies for execution (330). Through the Web interface (with text or voice browser) a user may enter a policy in a user friendly and intuitive way. This may be done by filling in structured sentences or by filling in forms, via a Web interface tailored to the particular environment of the user (hospital, law firm, store, school, home, etc.). The system of the invention provides structured information that may be converted into a formal representation (e.g. CPL or FIAT).

The user may then request that the multiple policies be tested for undesirable interactions in response to which a report is returned to the user indicating any and all interactions detected. Options are presented to the user for either manually correcting the features and their relative priorities or following a machine-developed recommendation for automatic correction. When the user is satisfied that no undesirable interactions remain, he/she may have them transmitted to the policy server 3 for operation.

Figure 4:
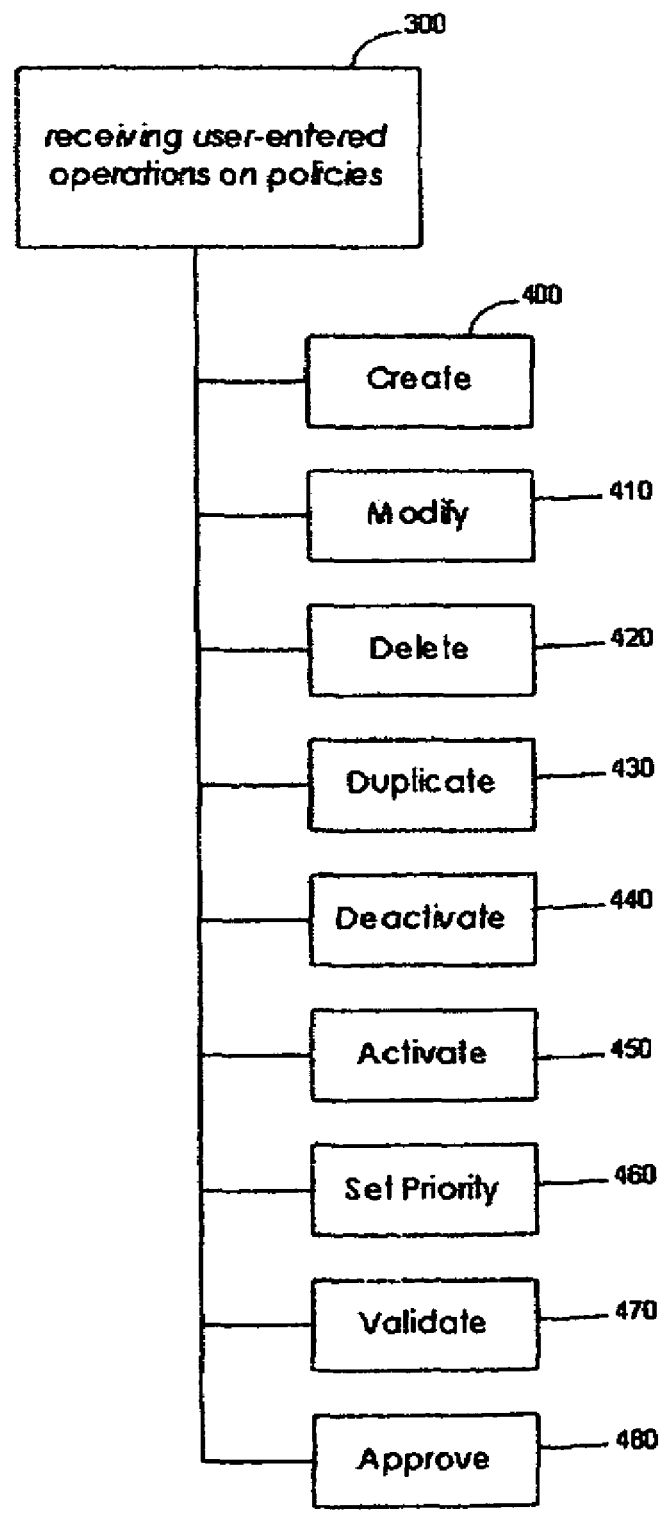
FIG. 4 is a block diagram of a step of receiving user-entered policies in the method of FIG. 1, according to an exemplary embodiment.

The Web interface enables a user to manage his/her list of policies (e.g. in a list box or in a different panel or frame), typically sorted by name or by priority. The following operations on policies are supported (via buttons, links, menus, or voice activation), as shown in FIG. 4:

Create (400): Create a new policy, add it to the list, and activate it.

Modify (410): Modify the selected policy.

Delete (420): Delete the selected policy from the list

Duplicate (420): Make a copy of the selected policy (with the intention of modifying it later).

Deactivate (440): Deactivate the selected policy. Policies that are inactive are still kept on the list but are marked as such (e.g. different color or shadowed text). They are not used for validation or execution, but they are kept for future activation.

Activate (450): Activate the selected inactive policy.

Set Priority (460): Set the priority of the selected policy, which can be an absolute priority or a relative one (e.g. move the policy higher or lower in the list when sorted by priorities).

Validate (470): Detect and report conflicts in the list of active policies.

Approve (480): Approve the current list of policies and enable them for execution (e.g. through the generation of a single CPL script uploaded to the call control switch 1 or to the policy agent 3).

Policies can be created using structured text, obtained in various ways (free form, lists, pop-up menus, etc.) from the user. A policy contains seven main elements:

A name, used as unique identifier.

A priority, expressed as a numerical value.

The operation, which is typically either forward an incoming call, block an incoming call, or block an outgoing call.

A precondition, based on the characteristics of the caller or callee (e.g. phone number, role, domain, location, organization/business, name, device, presence information, etc.). Many characteristics can be combined in a logical expression.

The operation target, typically a phone number, a person, a role, a device, voice mail, etc.

An optional list of exceptions to a general precondition, based on the same types of characteristics.

A time constraint, where the policy is active. This can be a specific time interval (e.g. from 1:00 to 2:00) or recurring intervals (e.g. every Tuesdays). "Forever" can be used to specify the absence of time constraint.

A policy is general when the precondition is a domain of values (e.g. all calls, all calls from Canada, all calls from Mitel). If the precondition relates to particular values, then the policy is specialized. A general policy may contain exceptions, which are typically particular values (often in the same domain as the one used in the precondition, but not necessarily).

For example, consider the following general policy:

Mitel_T_Pager (2):

Forward calls from Mitel to My Pager except if the call is from Terry March from 09:00 on Sunday, Nov. 24, 2002 to 10:00 on Friday, Nov. 29, 2002.

The policy name is Mitel_To_Pager and the priority is 2;

The operation is the forwarding of an incoming call, and its target is My Pager;

The precondition is all calls from Mitel, with the exception of Terry March;

The time constraint is from 9:00 on 2002 Nov. 24 to 10:00 on 2002 Nov. 29.

On the Web interface, various elements can be hyperlinked to the form where they have been defined (e.g. the underlined elements in the example Mitel_To_Pager policy).

As discussed above, individual policies created by end-users are either specialized (e.g. how to process calls from a specific individual) or general (e.g. how to process all incoming calls) with an optional list of exceptions. In both cases, individual policies are translated into CPL specifications that consist of a single branch (instead of the usual decision tree). Rather than bundling all features into a single tree with implicit priorities, individual features are described as individual trees with explicit priorities among them. Prioritization of the policies is achieved through numerically naming the CPL scripts. Besides priority between policies, a priority also applies between the exceptions and the general case. For operation, this structure may be retained and the features executed by a system that is aware of the single trees and individual priorities. Alternatively, the features can be executed on a standard CPL-enabled system, by connecting the features together using CPL OTHERWISE statements in descending order of priority to create a standard CPL feature tree.

The translation of specialized policies into FIAT rules is straightforward: the single branch is visited downward, collecting the condition (e.g. time, caller, domain . . . ), the trigger (e.g. incoming call parameters) and the result (e.g. redirect, location). This information is then used to produce the corresponding FIAT rule, using the following mapping:

| Policy | FIAT Rule |
| --- | --- |
| Name | Rule name |
| Priority | Rule number |
| Operation | Rule result |
| Precondition | Rule triggering event |
| Target | Rule result |
| Exceptions | Rule constraint |
| Time constraints | Rule precondition |

Consider the following example of a policy (with name Conference and priority 1) that redirects incoming calls from Reception to My Pager (available at the address terry_march@pager.ottawahospital.com) during a conference in November:

Forward calls from Reception to My Pager (no exceptions) from 09:00 on Sunday, Nov. 24, 2002 to 10:00 on Friday, Nov. 29, 2002.

The CPL script generated from this policy and called Conference_1 is the following:

```
<cpl>
  <incoming>
    <time-switch>
      <time dtstart="20021124T090000" dtend="20021129T100000" >
        <address-switch>
          <address contains="Reception">
            <location url="sip:terry_march@pager.
            ottawahospital.com">
              <proxy/>
            </location>
          </address>
        </address-switch>
      </time>
    </time-switch>
  </incoming>
</cpl>
```

The translation of the CPL script into FIAT becomes:

```
feature(['Conference',1],
  [subs(user,Any),time([dtstart(d(2002,11,24,9,0,0)),
  dtend(d(2002,11,29,10,0,0)),
    interval('1'),wkst('MO')])],
  [incoming([address(contains('Reception'))])],
  [proxy([location('sip:terry_march@pager.ottawahospital.com')])]) :-
    true.
```

In the previous FIAT rule:
  ['Conference',1] is the rule identifier, with the rule priority.
  [subs( . . . ), time( . . . )] is the rule precondition corresponding to the policy time constraint, if any. The subs part, required by FIAT, is not used in the mapping.
  [incoming( . . . )] is the rule triggering event, corresponding to the policy precondition.
  [proxy( . . . )] is the rule result, corresponding to the policy operation and its target.
  true is the rule constraint. It is set to true for specialized policies (no constraint), but it is used to represent exceptions in general rules.

A general policy that contains exceptions generates a separate CPL specification for the general case, and one for each exception (as opposed to being combined into a single CPL script using the otherwise construct). The exceptions bear a higher priority than the general case, and this is reflected by the numerical naming scheme discussed above.

The set of CPL scripts that constitute a general policy are translated one at a time. While the translation of the first script is identical to the translation of specialized policies, the translation of the subsequent parts of that policy varies: they are further refined by adding the negation of the conditions of all previously translated parts. This process can be depicted as:

```
previous_conditions = empty;
foreach part in (list_of_CPL_parts)
  collect {conditions, triggers, results} from part
  produce_FIAT(conditions and not(previous_conditions),
  triggers, results)
  previous_conditions = previous_conditions + conditions
```

Figure 5:
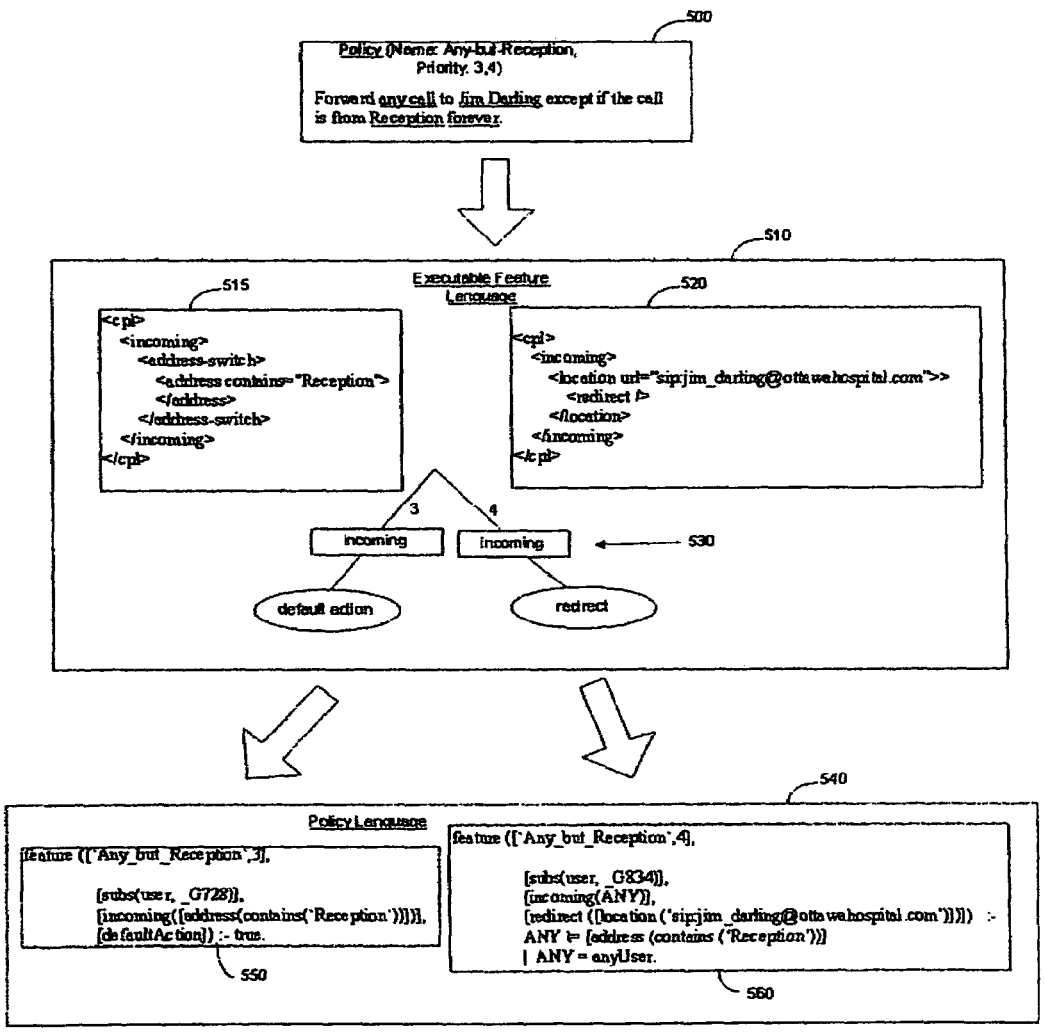
FIG. 5 is a block diagram showing translation of an exemplary user-entered policy into executable feature language as scripts representing branches of a decision tree, and translation of the policy into a policy language, according to an exemplary embodiment.

For example, as depicted in FIG. 5, the following is a policy (500) that forwards all incoming calls to Jim Darling, unless the call originates from Reception:

Forward any call to Jim Darling except if the call is from Reception forever.

As discussed above, the policy (500) is translated into an executable feature language (510) in the form of CPL scripts (515 and 520), as follows:

```
<cpl>
  <incoming>
    <address-switch>
      <address contains="Reception">
      </address>
    </address-switch>
  </incoming>
</cpl>
``` and

```
<cpl>
  <incoming>
    <location url="sip:jim_darling@ottawahospital.com">
      <redirect />
    </location>
  </incoming>
</cpl>
```

It will be noted that the absence of specific actions to be taken in the first CPL script results in the default behaviour of the system, namely to accept the incoming call as depicted by the leaf at the bottom of the left branch of the decision tree 530, discussed in greater detail below.

The translation of the foregoing CPL scripts into FIAT policy language (540) becomes (550) and (560), respectively:

```
feature(['Any_but_Reception',3],
  [subs(user,_G728)],
  [incoming([address(contains('Reception'))])],
  [defaultAction]) :-
    true.
``` and

```
feature(['Any_but_Reception',4],
    [subs(user,_G834)],
    [incoming(ANY)],
    [redirect([location('sip:jim_darling@ottawahospital.com')])]) :-
    ANY \= [address(contains('Reception'))]
    | ANY = anyUser.
```

As discussed above, all CPL scripts are assigned a priority. This priority is preserved within the FIAT rules such that later interpretation of the importance of the incoherence detected may be qualified. The lowest numerical value is associated with the highest priority (herein given to the exception rule).

Time constraints, specified with semantics close to that of the iCalendar standard, may represent unique occurrences as well as recurring intervals. To cope with this particularity, the set of FIAT rules also specifies that any two rules for which time does not overlap are rules in contradiction, and therefore should not be pair-wise analyzed for incoherences. For example, given that one rule applies to Mondays and another to Tuesdays, their time specifications do not overlap; this non-overlapping characteristics is seen by FIAT as a contradiction and no further analysis is carried on that pair of rules.

For any pair of time specifications, an overlapping interval may be sought as:

```
intervalFound = timeLimitReached = false
repeat until intervalFound or timeLimitReached
    if (lowerBoundary(timeSpec1) isWithin boundariesOfTimeSpec2 or
        upperBoundary(timeSpec1) isWithin boundariesOfTimeSpec2 or
        lowerBoundary(timeSpec2) isWithin boundariesOfTimeSpec1 or
        upperBoundary(timeSpec2) isWithin boundariesOfTimeSpec1)
        then
            intervalFound = true
    endif
    if timeSpec1 startBefore timeSpec2 then
        timeSpec1 = nextInterval(timeSpec1)
    else
        timeSpec2 = nextInterval(timeSpec2)
    endif
    if upperBoundary(timeSpec1)>timeLimit or
    upperBoundary(timeSpec2) > timeLimit
        then
            timeLimitReached = true
    endif
```

The timeLimit selected should reflect the life expectancy of the rule (e.g. a year). The search for an interval should also cease when a nextInterval cannot be computed (e.g. such is the case for a time specification that applies to a unique event like a conference).

For a system in which a standard CPL script integrating multiple features/policies is provided (e.g. generated manually or by other means), the system of the present invention extracts individual CPL scripts with priorities for processing by the system as set forth below.

CPL specifications are totally ordered. Hence, in a strict sense, there can be no conflicting instructions, or interactions. The burden of establishing this total ordering is carried by the user.

The general structure of a CPL specification is a decision tree (530). At some point, an element of decision is elected (e.g. caller): either the condition is verified, the condition is not verified, or the element of decision is not present. In each case, a corresponding sub-tree follows with further instructions. Eventually, each branch develops, not into sub-trees, but rather into a leaf that consists of an action to be performed (e.g. redirect, reject).

To permit coherence analysis, the tree of call processing instructions of the CPL specification is flattened into a FIAT description. That is, once for the tree of incoming calls, and once for the tree of outgoing calls. Starting at the top, the tree is visited while collecting conditions and triggers defined in the elements of decision of the nested sub-trees. Both conditions and triggers are contextual pieces of information that can semantically be put in a single set. But, for the sake of interpretability and user-friendliness, contextual information is collected as conditions (e.g. time) while triggers are based on acute and connection-oriented facts (e.g. who is calling). Actions to be performed (e.g. redirect) are collected as results.

When the visit of a tree reaches a leaf (i.e. an action to be performed), the conditions, triggers and results collected thus far are output as a FIAT rule. The visit continues by returning to the closest upward decision point with an unvisited branch, resetting the collection of conditions, triggers and results as they were at that point, and carrying on with the visit of the yet unvisited branch (this is called a depth-first traversal). If the branch is an "otherwise", the corresponding condition is negated; if the branch is a "not-present", the corresponding condition is removed. Then, the visit of the tree is resumed.

As FIAT rules are produced, they are assigned a priority such that later analysis may provide more precise information on the incoherences based on the ordering used in the CPL specification.

The incoherences reported by FIAT contain information identifying the features, their priorities, and the incoherence itself. The first step toward the interpretation of the incoherence consists in determining the type of policy, namely whether they are general or specialized (335). In some cases, further understanding of the problem is obtained by comparing the relative priorities of the policies (340). Then, the problem is reported to the user. This reporting starts by identifying the category of incoherence (345), the role of each policy in the problem is exposed (350), an example of the possible misbehaviour resulting from the presence of the two policies is given (355) and, when applicable, one or many ways to correct the situation are proposed.

Figure 6:
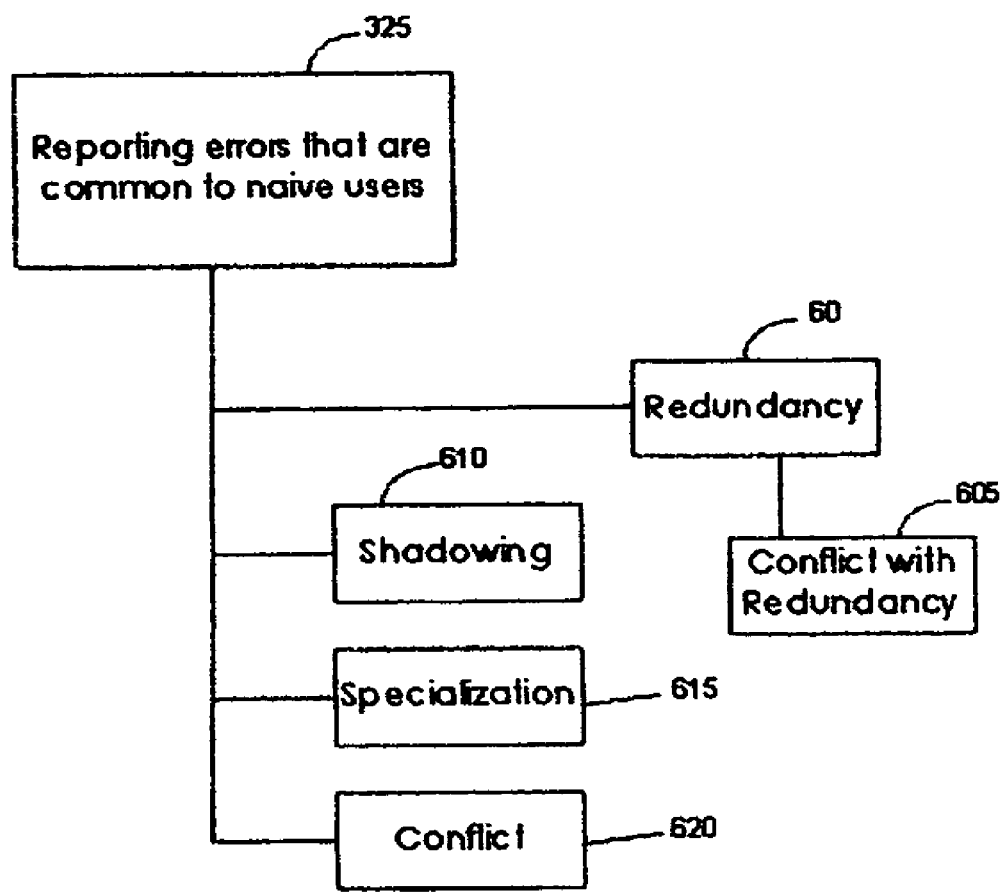
FIG. 6 is a block diagram showing an example of errors that are common to naïve users.

The following types of problems are reported to the user, as depicted in FIG. 6:

0. Redundancy (600): Two general policies are active. A special case is Conflict with Redundancy (605), where a general policy and an exception for the other general policy lead to different resulting actions.
1. Shadowing (610): A general policy (i.e. that applies to all members of a user-defined domain, but potentially with exceptions) overrides a specific policy (that applies to an enumeration of one or many individuals). The specific policy can never be triggered.
2. Specialization (615): Notifies that a specific policy will be selected over a general policy of lower priority.
3. Conflict (620): Two policies address the same situation (their preconditions overlap) but with different resulting actions.
    a. Edit a policy (3600, which enables the user to modify one of the conflicting policies.
    b. Disable a policy (365), which deactivate a policy, without deleting it.
    c. Set the priority of a first policy above/below the priority of a second policy 370).
    d. Add an exception to a general rule (375).
    e. Tolerate the conflict (380) and no longer report it (leave it to the system to decide).

The comments explaining the conflicts have hyperlinks to the policies involved, hence they can at any time be edited (suggestion a, above). Also, each detected conflict, whatever its nature, can be tolerated and put in a database so it will no longer be reported (suggestion e, above).

The other types of suggestions (b, c, d) are adapted to the particular conflict detected, and only the relevant suggestions are offered:

| Conflict | Suggestions |
|---|---|
| Redundancy | Add (duplicate) exception to general policy and |
| | Disable first general policy |
| | Disable second general policy |
| Shadowing | Set priority of specialized policy above that of general policy |
| | Set priority of general policy below that of specialized policy |
| | Disable general policy |
| | Disable specialized policy |
| Specialization | Notice/warning (no suggestion) |
| Conflict | Disable first policy |
| | Disable second policy |

To facilitate and accelerate the correction of the policies, the suggestions proposed to the users are hyper-linked to commands and parameters that instruct the system to apply the one selected (e.g. clicked on), as discussed in greater detail below.

Each incoherence detected by FIAT can be interpreted according to the following procedure:

```
foreach incoherence in (list_of_incoherences) {
    where incoherence = (Feature1, Feature2, problem)   % Tuple structure
    determineCategory(incoherence, Category)
    if priority(Feature1) > priority(Feature2) then
        swapNumbersOfFeatures                            % to report on
(incoherence)                                            shadowing
    endif
    reportConflict(incoherence, Category)
}
``` where:

and:

```
reportConflict(Incoherence, Category) :-
    case Category of
        0: if generalTrigger(problem) then
            "Redundancy: both policies provide directives for all
            incoming calls"
           else
            "Conflict: exceptions collide"
           endif
        1:"Shadowing: general policy Feature1 overrides policy Feature2"
        2:"Specialization: policy Features1 specializes general
        policy Feature2"
        3:"Conflict: both policies address the same condition"
    endcase
```

Using such a procedure, HTML code can be produced to format the report and provide appropriate hyperlinks to the user, via the original interface used to generate the policies (e.g. Web browser).

EXAMPLE

As an example of conflict reporting with suggestions, consider the following set of four policies (prioritized as they appear), wherein words underlined are hyperlinks to definitions (in policies and conflicts) or to correction procedures (in suggestions):

Conference:
    Forward calls from Reception to My Pager (no exceptions) from 09:00 on Sunday, Nov. 24, 2002 to 10:00 on Friday, Nov. 29, 2002.

Working_From_Home:
    Forward any call to My Home Phone (no exceptions) forever.

Any_but_Reception:
    Forward any call to Jim Darling except if the call is from Reception forever.

```
determineCategory(incoherence, Category) :-
    where incoherence = (Feature1, Feature2,problem)    % Tuple structure
    if generalPolicy(Feature1) then                     % Feature1 is general
        if generalPolicy(Feature2) then                 % Feature2 is general
            Category = 0                                % REDUNDANCY+CONFLICT?
        else                                            % Feature2 is specialized
            if priority(Feature1) > priority(Feature2) then
                Category = 1                            % SHADOWING
            else
                Category = 2                            % EXCEPTION/SPECIALIZATION
            endif
        endif
    else                                                % Feature1 is specialized
        if generalPolicy(Feature2)                      % Feature2 is general
            if priority(Feature1) < priority(Feature2) then
                Category = 1                            % SHADOWING
            else
                Category = 2                            % EXCEPTION/SPECIALIZATION
            endif
        else                                            % Feature2 is specialized
            Category = 3                                % CONFLICT
        endif
    endif
```

Appointment:
Forward calls from Reception to My Pager (no exceptions) from 08:00 on Thursday, Nov. 28, 2002 to 17:00 on Monday, Dec. 02, 2002.

Some of the problems uncovered by FIAT and interpreted by the above algorithm include:

Specialization

The Policy Conference specializes the general policy Working_From_Home.

When a call comes in from 'Reception', it will be forwarded to location 'sip:terry_march@pager.ottawahospital.com' by policy Conference, instead of being forwarded to location 'sip:terry_march@home.ottawahospital.com' by the general policy Working_From_Home.

The system therefore generates a notice:

Suggestion:
TOLERATE this conflict

Conflict

Both policies Conference and Any_but_Reception address the situation where a call comes in from 'Reception', but they react differently.

Since the policy Conference has priority over policy Any_but_Reception, the call will be forwarded to location 'sip:terry_march@pager.ottawahospital.com' (instead of being [defaultAction].)

Suggestions:
if the currently prioritized policy is preferred, DISABLE policy Any_but_Reception
else, if the alternative is preferred, DISABLE policy Conference
TOLERATE this conflict Conflict within Redundancy The general policies Working_From_Home and Any_but_Reception specify conflicting actions to be taken when a call comes in from 'Reception'.

The call will be forwarded to location 'sip:terry_march@home.ottawahospital.com' since Working_From_Home has higher priority, while policy Any_but_Reception would have let it through.

Suggestions:
see the related Redundancy warning, below, for details.

Redundancy

The general policies Working_From_Home and Any_but_Reception both provide directives for all incoming calls.

The policy Working_From_Home has higher priority and will have calls forwarded to location 'sip:terry_march@home.ottawahospital.com'. Policy Any_but_Reception will never have calls forwarded to location 'sip.jim_darling@ottawahospital.com'.

Suggestions:
if the current priority is preferred,
ADD EXCEPTION for Reception to policy Working_From_Home
DISABLE policy Any_but_Reception
if the alternative is preferred,
DISABLE policy Working_From_Home
TOLERATE this conflict Shadowing The general policy Working_From_Home overrides policy Appointment.

When a call comes in from 'Reception', it will be forwarded to location 'sip:terry_march@home.ottawahospital.com' by policy Working_From_Home instead of being forwarded to location 'sip:terry_march@pager.ottawahospital.com' by policy Appointment.

Suggestions:
SET PRIORITY of Appointment above that of Working_From_Home
SET PRIORITY of Working_From_Home below that of Appointment
DISABLE policy Working_From_Home
DISABLE policy Appointment
TOLERATE this conflict Various levels of sensitivity for the detection of conflicts can be defined by the user, in a way similar to compiler options where one can choose the types of warning to be reported while compiling the source code of a program. Each level is essentially a subset of the four types of conflicts defined above. Predefined levels can easily be defined for naïve users:

Complete: Redundancy, Shadowing, Specialization, and Conflict
Errors only: Redundancy, Shadowing, and Conflict
Conflicts only: Redundancy and Conflict. This option is particularly useful in a system where individual policies are integrated in such a way that a specific policy always has priority over a (otherwise conflicting) general policy.

Additionally, the database containing the previously detected conflicts can be turned off or be reset. This enables end-users to get a complete list of conflicts for a particular level of sensitivity.

In the previous examples of suggestions, all underlined actions (e.g. set priority, disable) are in fact hyperlinks constituting URLs with appropriate addresses and arguments that request from the policy server that the modifications selected by the user (i.e. clicked on) be executed. This automation level avoids the need to have the end-user modify the policies manually (and potentially make mistakes along the way). The conflict explanations also have hyperlinks to the policies involved, hence they can at any time be edited.

Each detected conflict tagged as "tolerated" is put in a database so it will no longer be reported. FIAT natively supports a database of previously found incoherences, and hence it can be used directly to avoid reporting known and tolerable conflicts.

It will be noted that the conflict resolution chosen by a user is based on local priorities and local activation of policies, and hence is independent from that of other users. Such personalized policy conflict resolution enables the same conflict to be addressed in different ways by different users, which is a major improvement over conventional telephony systems.

Once the incoherences have been removed and the individual policies (CPL branches) ordered according to the priorities desired by the user, the individual policies may be integrated into a single CPL script according to the following recursive procedure:

```
integrate(set_of_branches) :-
    outputBranch(first_branch_of(set_of_branches))
    remove_first_branch_of(set_of_branches)
    if not(empty(set_of_branches)) then
        open_otherwise
        integrate(set_of_branches)
        close_otherwise
    endif
```

A more advanced procedure can also prioritize the policies in a way that removes all shadowing conflicts automatically, before the integration. Such an integration would implement the naive view that specialized policies always have priority over (conflicting) general policies, at the cost of less flexibility:

```
removeShadowingAndIntegrate(set_of_branches) :-
   detectConflicts(set_of_branches, ConflictList)
   foreach conflict in (ConflictList) {
      if type(conflict) = shadowing then
         % Adjust the priorities in set_of_branches
         givePriorityTo(specializedPolicy(conflict), set_of_branches)
      endif
   }
   integrate(set_of_branches)
```

While the embodiments discussed herein are directed to particular implementations of the present invention, it will be apparent that variations and modifications to these embodiments are within the scope of the invention as defined solely by the claims appended hereto. For example, whereas the embodiment set forth herein illustrates how Web interfaces (running on personal computers, PDAs, mobile phones, phones with HTML browsers, etc.) can be used to manage personal policies, as suggested above, voice-activated interfaces can also be used. Existing voice interfaces provide audio menus and speech-recognition capabilities, thereby enabling the user to manage policies through his/her phone (wired or wireless) at any time and anywhere. To support voice, the Web server 7 needs to be coupled to a voice server and to generate the interface in a language such as VXML (Voice XML) instead of (or in addition to) the conventional HTML used for Web interfaces.

The embodiment of the invention set forth above is directed to the situation where one end-user has control over all of his/her call processing policies. However, in an enterprise, there could be several layers of policies involved. For instance enterprise policies may be imposed on all employees (e.g. no outgoing calls to 1-976 numbers, also known as dirty lines), and group policies may be applicable to a group of individuals (e.g. no long-distance calls, obligation to answer calls from the group manager (no voice mail), etc.). Personal policies defined by the end-user may obviously conflict with group and enterprise policies.

In this context, conflicts are detected in the same way as discussed above in connection with personal policies only. A sorted list of policies is produced out of the combination of enterprise, group, and personal policies. A typical priority scheme for these layers would be 1-enterprise, 2-group, and 3-personal, but more fine-grained arrangements may be supported. For instance, group policies may be split into two sets, the first with a priority higher than personal policies (mandatory), and the second with lower priority (can be overridden by personal policies). The analysis mechanism takes such scheme into consideration when reporting the conflicts (e.g. do not report conflicts between personal policies and group policies of lower priority).

End-users would not have any means to modify group or enterprise policies, only their personal policies in such an enterprise application. Group and enterprise policies would be managed separately by designated administrators with sufficient access privileges.

Other variations and modifications will occur to those of skill in the art. All such variations and modifications are considered to be within the sphere and scope of the present invention.

We claim:

1. A method of personalizing user call features in a policy-based network management system for a telephony call processing system, comprising:

receiving from a remote system a user-entered call feature policy entered in a natural language that is understandable to a user;

translating said policy from said natural language into an executable feature language capable of execution by said telephony call processing system;

translating said policy from said executable feature language into a policy conflict detection language and detecting common feature interaction errors in said policy or between said policy and other policies;

translating said feature interaction errors from said policy conflict detection language to said natural language that is understandable to the user and reporting said errors to the user;

providing the user with a recommendation for correction of said feature interaction errors and re-integration of said policy in said executable feature language; and uploading said policy for execution by said telephony call processing system, whereby said policy is personalized and local to only said user.

2. The method of claim 1, wherein said user enters said policy via a Web browser interface.

3. The method of claim 1, wherein said executable feature language is Call Processing Language (CPL).

4. The method of claim 1, wherein said policy conflict detection language is Feature Interaction Analysis Tool (FIAT).

5. The method of claim 1, wherein said step of receiving said user-entered call feature policy further comprises receiving user-entered operations on said policy, including:

Create: for creating and activating a new policy;
Modify: for modifying a selected policy;
Delete: for deleting a selected policy;
Duplicate: for making a copy of a selected policy;
Deactivate: for deactivating a selected policy;
Activate: for activating a selected inactive policy;
Set Priority: for setting priority of a selected policy to one of either an absolute priority or a relative priority;
Validate: for detecting and reporting conflicts among active ones of said policies; and
Approve: for approving and enabling selected policies for execution.

6. The method of claim 1, wherein each said policy includes:

a name for use as a unique identifier;
a priority, expressed as a numerical value;
an operation, for application to a call within said communication system;
a precondition, based on characteristics of a caller or callee, whereby said policy is general in the event that the precondition is a domain of values, and is specialized in the event that the precondition relates to particular values;
a target, for said operation;
an optional list of exceptions to said precondition in the event that that said policy is general; and
a time constraint, during which the policy is active.

7. The method of claim 6, wherein individual ones of said policies are translated into said executable feature language as scripts representing individual branches of a decision tree, with explicit priorities allocated among said branches.

8. The method of claim 7, wherein said priorities are allocated by numerically naming the individual branches.

9. The method of claim 8, wherein said step of translating said policies from said executable feature language into said policy conflict detection language further comprises visiting successive ones of said branches downwardly and producing corresponding rules, using the following mapping: name policy to name rule; priority policy to number rules; operation policy to result rule; precondition policy to triggering event rule; target policy to result rule; exceptions policy to constraint rule; and time constraints policy to precondition rule.

10. The method of claim 1, wherein said step of reporting said errors further includes identifying a category of incoherence, assigning a role of each policy in the occurrences of said errors, and providing examples of possible misbehavior resulting from said feature interaction errors.

11. The method of claim 10, wherein said errors in said reporting step comprise:
   Redundancy: whereby two general policies are active;
   Shadowing: whereby a general policy overrides a specific policy such that the specific policy can never be triggered;
   Specialization: whereby a specific policy is selected over a general policy of lower priority; and
   Conflict: whereby two policies have overlapping preconditions but with different resulting actions.

12. The method of claim 11, wherein said Redundancy error includes a Conflict with Redundancy error whereby a general policy and an exception for the other general policy lead to different resulting actions.

13. The method of claim 12, wherein said step of providing the user with a recommendation for correction of said feature interaction errors includes the following suggestions:
   edit a policy;
   disable a policy;
   set the priority of a first policy above or below the priority of a second policy;
   add an exception to a general rule; and
   tolerate the interaction and no longer report the interaction.

* * * * *